US008382353B2

(12) United States Patent
Tominaga et al.

(10) Patent No.: US 8,382,353 B2

(45) Date of Patent: Feb. 26, 2013

(54) HEADLAMP ASSEMBLY FOR MOTOR VEHICLE

(75) Inventors: Motonori Tominaga, Anjo (JP); Takahito Nishii, Nagoya (JP); Yasutoshi Horii, Nagoya (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 77 days.

(21) Appl. No.: 13/065,752

(22) Filed: Mar. 29, 2011

(65) Prior Publication Data

US 2011/0242833 A1 Oct. 6, 2011

(30) Foreign Application Priority Data

Mar. 31, 2010 (JP) ................................ 2010-082210

(51) Int. Cl.
*B60Q 1/00* (2006.01)

(52) U.S. Cl. ........... 362/547; 362/373; 362/507; 165/75

(58) Field of Classification Search .................. 362/294, 362/547, 545, 373, 507, 540, 538; 257/712, 257/722; 174/252; 165/75
See application file for complete search history.

(56) References Cited

U.S. PATENT DOCUMENTS 7,762,696 B2 * 7/2010 Wan et al. .................... 362/373

FOREIGN PATENT DOCUMENTS

| | | |
|---|---|---|
| JP | 2005-190825 | 7/2005 |
| JP | 2007-12368 | 1/2007 |
| JP | 2008-123756 | 5/2008 |
| JP | 2008-123836 | 5/2008 |
| JP | 2008-277237 | 11/2008 |
| JP | 4289268 | 4/2009 |
| JP | 2009-147175 | 7/2009 |
| JP | 2009-212019 | 9/2009 |
| JP | 2010-108637 | 5/2010 |

* cited by examiner

*Primary Examiner* — Ali Alavi

(74) *Attorney, Agent, or Firm* — Harness, Dickey & Pierce, PLC

(57) ABSTRACT

In a light chamber formed by a housing case and a lens cover of a headlamp assembly, a projection lens and a light source are arranged in order along an optical axis of the light source from a front side of the light chamber. Radiating fins of a plate shape is vertically placed in the light chamber and radiate heat energy generated by the light source. A heat exchange chamber is formed in a ceiling wall of the housing case above the radiating fins. The heat exchange chamber has a concave shape from the ceiling wall of the housing case, and is open toward the radiating fins side.

15 Claims, 8 Drawing Sheets

HEADLAMP ASSEMBLY FOR MOTOR VEHICLE

CROSS-REFERENCE TO RELATED APPLICATION

This application is related to and claims priority from Japanese Patent Application No. 2010-082210 filed on Mar. 31, 2010, the contents of which are hereby incorporated by reference.

BACKGROUND OF THE INVENTION

1. Field of the Invention

The present invention relates to headlamp assemblies for motor vehicles, equipped with one or more radiating members capable of radiating heat energy generated by one or more light sources.

2. Description of the Related Art

There are various types of headlamp assemblies mounted to motor vehicles equipped with light emitting diodes. For example, Japanese patent No. JP 4289268 has disclosed such a headlamp assembly comprised of a headlamp and a light emitting diode. In the headlamp assembly, a light projection lens, a shade and a light source are arranged in turn, and a reflector is arranged so that it faces the light source. The reflector reflects the light generated by the light source to the forward direction. One or more radiating members are mounted to the light source in order to radiate the heat energy generated in the light source.

In the headlamp assembly, the light source is comprised of a first light source and a second light source. The first light source has a first light emission part which is vertically placed at an upper part observed from an optical axis of the light source. The second light source has a second light emission part which is vertically placed at a lower part observed from the optical axis of the light source. That is, the headlamp assembly generates two light beam patterns.

In general, a light emitting diode has an intrinsic drawback because of having a high heat density. For example, when the temperature of a light emitting diode becomes increases, the light emitting efficiency is decreased, and its lifetime becomes short. Therefore, when light emitting diodes are closely arranged to each other and a small sized radiating member is used for decreasing the entire size of the headlamp assembly, the heat generation density becomes high and the heat radiating capability of the headlamp assembly is decreased.

In order to avoid the above conventional drawback, there is a conventional technique. For example, Japanese patent laid open publication No. JP 2005-190825 has disclosed such a conventional technique in which a headlamp assembly is equipped with an electric fan. The electric fan makes air flow from the rear side of a lamp chamber to the front side of the lamp chamber. Thus, the electric fan forcedly makes the heated air flow from the rear side of the lamp chamber to the front side of the light chamber in order to cool the inside of the light chamber.

Further, Japanese patent laid open publication No. JP 2009-147175 has disclosed a conventional technique in which a coolant flows in a printed circuit board on which one or more light emitting diodes are disposed in order to cool the light emitting diodes, and the coolant is supplied by a pump to the radiating plate through a cooling pipe in order to radiate heat energy from the radiating plate. This conventional technique increases the heat radiating capability.

However, the conventional techniques previously described require an electric fan in a lamp chamber and/or a pump and a cooling pipe in order to forcedly cool the light emitting diodes. This increases the entire size of the headlamp assembly, and electric power consumption because the conventional headlamp assemblies further need to have additional electric power in order to drive the above electric fan and pump.

SUMMARY OF THE INVENTION

It is an object of the present invention to provide a headlamp assembly for vehicles with increased radiating capability without increasing the size and electric power consumption of the headlamp assembly.

In accordance with an aspect of the present invention, there is provided a headlamp assembly for a motor vehicle. The headlamp assembly is comprised of a housing case, a lens cover, a light source, a projection lens, a radiating member and a heat-exchange chamber. A front part of the housing case is open. The lens cover is fitted to the front part of the housing case so as to form a light chamber. The light chamber is a closed space by the lens cover and the housing case. A light source generates and emits light. The light source is placed in the light chamber. The projection lens is placed in the light chamber. The projection lens projects the light emitted from the light source toward a front side of the headlamp assembly. The radiating member is placed in the light chamber. The radiating member is comprised of a plurality of radiating fins for radiating heat energy generated by the light source. The heat exchange chamber is formed in the housing case above the radiating member in the light chamber. The heat exchange chamber is open toward a bottom wall of the light chamber.

It is preferable for the heat exchange chamber to be formed in a ceiling wall of the housing case so that the heat exchange chamber has a convex shape toward the upper side of the housing case.

It is also preferable for the heat exchange chamber to be formed by a lib part. The rib part projects from a ceiling wall of the housing case toward the bottom wall of the housing case.

It is also preferable for the ceiling wall of the housing case to have a ceiling hole. The ceiling hole is covered with a cover unit in order to form the heat exchange chamber so that the heat exchange chamber has a convex shape toward the upper side of the housing case.

It is also preferable for the cover unit to have a heat conductivity which is higher than a heat conductivity of the housing case.

It is also preferable for a rib part to be formed around the ceiling hole of the housing case. The rib part projects from the ceiling wall of the housing case toward the bottom wall of the housing case.

It is also preferable for the headlamp assembly to have a seal member. The seal member is placed between the cover unit and the housing case. A male screw part is formed on the outer periphery of the cover unit. A female screw part is formed on the inner periphery of the rib part formed around the ceiling hole of the housing case. The male screw part of the cover unit is screwed to the female screw part of the rib part of the housing case.

It is also preferable for the heat exchange chamber to have a central heat exchange chamber and a heat exchange sub-chamber. The central heat exchange chamber is formed at a central part of the heat exchange chamber. The heat exchange sub-chamber is formed around the central heat exchange chamber, and is open toward a bottom wall of the light chamber. In particular, it is possible for the heat exchange sub-chamber to have a cross section of one of a circular shape, a rectangle shape, and a hexagonal shape.

It is also preferable for an air flow hole to be formed on the outer periphery of the rib part and is open toward the front side of the headlamp assembly.

It is also preferable for a bottom part of the rib part which projects from the ceiling wall of the housing case to have an oblique shape and open toward a front bottom side of the light chamber.

As previously described and will be explained in the following first to eighth embodiments, the headlamp assembly according to the present invention has a long air-flow path with which the heat exchange between the warmed air and the outside ambient air is executed with high efficiency. The heat exchange between the inner warmed air in the light chamber and the outside ambient air of the lens cover is also executed through the wall surface of the lamp cover. The structure of the headlamp assembly according to the present invention promotes the heat exchange and increases the radiating performance without increasing the entire size and electric power consumption of the headlamp assembly. The presence of the rib part and the sub-rib part further increases the radiating performance of the headlamp assembly.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
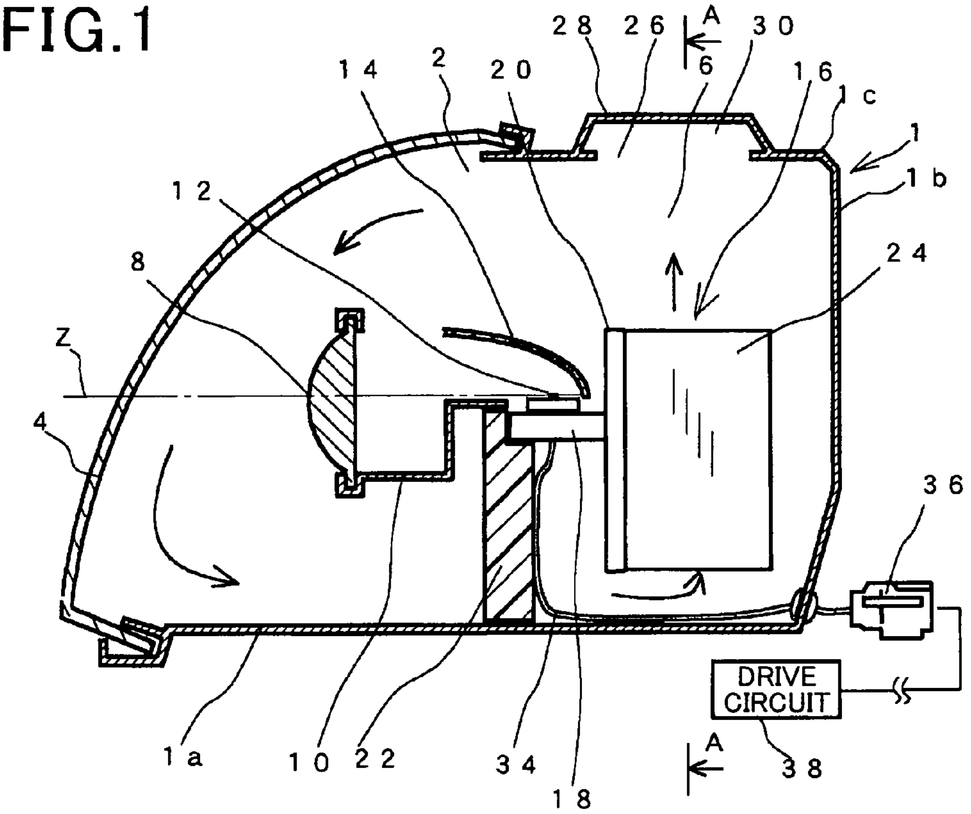
FIG. 1 is a schematic view showing a vertical cross section of a headlamp assembly mounted to a vehicle according to a first embodiment of the present invention.

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of the headlamp assembly according to a first embodiment of the present invention with reference to FIG. 1 and FIG. 2.

FIG. 1 is a schematic view showing a vertical cross section of the headlamp assembly mounted to a vehicle according to the first embodiment of the present invention. As shown in FIG. 1, the headlamp assembly according to the first embodiment is comprised of a housing case 1, a front lens cover 4 and other various types of components. A front part 2 of the housing case 1 is open. The front lens cover 4 is fitted and fixed to the front part 2 of the housing case 1 in order to approximately close the inside of the housing case 1. That is, the housing case 1 and the front lens cover 4 makes a light chamber 6. The light chamber 6 accommodates the various types of components.

In the light chamber 6, a projection lens 8, a shade 10 and a light source 12 are arranged in turn along the optical axis Z of the light source 12 when observed from the front side toward the rear side of the headlamp assembly. A reflector 14 faces the light source 12. The reflector 14 reflects the light emitted from the light source 12.

In the structure of the headlamp assembly according to the first embodiment, the projection lens 8 is composed of a plane concave lens. The projection lens 8 and the reflector 14 are arranged in the housing case 1 so that they have approximately the same focal point. The reflector 14 has an inner reflection surface having a curved surface such as a rotational parabolic surface. The shade 10 cuts off a part of the light reflected by the reflector 14. The remained part of the light reflected by the reflector 14 is irradiated by the projection lens 8 to the front of the headlamp assembly. In the structure of the headlamp assembly according to the first embodiment, the shade 10 further acts as a supporting member capable of supporting the projection lens 8.

The light source 12 is equipped with a light emitting diode (LED). The light source 12 is mounted and fixed to a horizontal plate 18 of a radiating member 16.

The horizontal plate 18 has a plane shaped plate and placed in a horizontal direction in the headlamp assembly. A vertical plate 20 of the radiating member 16 is placed at the rear side of the horizontal plate 18. The horizontal plate 18 and the vertical plate 20 are assembled together.

The vertical plate 20 is approximately perpendicular to the optical axis Z of the light source 12. The vertical plate 20 is vertically placed in the headlamp assembly according to the first embodiment.

The horizontal plate 18 is fixed approximately at the central part of the vertical plate 20.

The front end of the horizontal plate 18 is fixed to a supporting member 22 which is vertically placed and fixed to the bottom wall 1*a* of the housing case 1. The rear end of the shade 10 is fixed to the supporting member 22.

A gap is formed between the bottom side of the vertical plate 20 and the bottom wall 1*a* of the housing case 1. This gap allows the air to adequately flow and circulate in the headlamp assembly. Further, a gap between the upper side of the vertical plate 20 and the ceiling wall 1*c* of the housing case 1. This gap also allows the air to adequately flow and circulate in the headlamp assembly. The horizontal plate 18 and the vertical plate 20 are made of material with high heat conductivity, for example, aluminum.

A plurality of radiating fins 24 are arranged on the rear surface of the vertical plate 20. Each of the radiating fins 24 has a plate shape, and vertically fixed onto the rear surface of the vertical plate 20 toward the rear side of the housing case 1. That is, as shown in FIG. 1, each of the radiating fins 24 is extended from the rear surface of the vertical plate 20 toward the rear side of the vertical plate 20. The radiating fins 24 are arranged at a predetermined interval to each other in order to flow air through them. Each of the radiating fins 24 has the same length of the vertical plate 20 along the vertical direction. The rear end of each of the radiating fins 24 and a rear wall 1*b* of the housing case 1 makes a gap having a predetermined interval.

The radiating fins 24 are made of material with high heat conductivity such as aluminum.

The horizontal plate 18, the vertical plate 20 and the radiating fins 24 are made in one body by aluminum forging. It is also acceptable to fix the radiating fins 24 made of aluminum plate onto the rear surface of the vertical plate 20 by brazing as a metal-joining process.

A ceiling hole 26 is formed in the ceiling wall 1*c* of the housing case 1 above the radiating fins 24. The ceiling hole 26 is covered with a cover unit 28. The ceiling hole 26 and the cover unit 28 are assembled together. The cover unit 28 has a convex shape and projects toward the upper part of the housing case 1. As shown in FIG. 1, a heat exchange chamber 30 is formed in the cover unit 28.

In the headlamp assembly according to the first embodiment, the ceiling hole 26 is formed above the radiating fins 24. However, it is possible to form the ceiling hole 26 into another part of the ceiling wall 1*c* of the housing case 1 unless it is positioned above the radiating fins 24.

Further, the ceiling hole 26 has a circular shape and approximately has a size of a circumscribed circle of the radiating fins 24. Still further, it is possible for the ceiling hole 26 to have a rectangle shape or a hexagonal shape, and have a large size than the circumscribed circle of the radiating fins 24.

The outer profile of the cover unit 28 has a circular truncated cone shape which projects toward the upper side like a concave shape.

The ceiling hole 26 is sealed with the cover unit 28. The cover unit 28 has a size in which the heat exchange chamber 30 is formed in the inside of the cover unit 28. That is, the bottom part of the heat exchange chamber 30 is open toward the radiating fins 24 side.

When the light chamber 6 accommodates a single unit composed of the projection lens 8, the shade 10, the light source 12 and the radiating member 16, the light chamber 6 requires a single group of the ceiling hole 26, the cover unit 28 and the heat exchange chamber 30. However, it is possible for the light chamber 6 to have a plurality of the groups.

When the light chamber 6 is equipped with a plurality of the units, each of the units is composed of the projection lens 8, the shade 10, the light source 12 and the radiating member 16, it is possible to place the group of the ceiling hole 26, the cover unit 28 and the heat exchange chamber 30 above the radiating fins 24 of each of the units.

Still further, it is possible to place the single ceiling hole 26, the cover unit 28 and the heat exchange chamber 30 which have a large diameter above a plurality of the radiating fin groups.

On the other hand, as shown in FIG. 1, leading wires 34 connected to the light source 12 are extended to the outside of the housing case 1 through the rear wall 1*b* of the housing case 1, and electrically connected to a drive circuit 38 through a connector 36.

The drive circuit 36 is a known circuit to supply electric power to the light source 12.

A description will now be given of the actions of the headlamp assembly according to the first embodiment of the present invention.

When the motor vehicle starts to drive and the light source is turned on, the light emitted from the light source 12 is reflected by the reflector 14.

The shade 10 cuts off a part of the light reflected by the reflector 14, and the projection lens 8 irradiates the remained part (or non-cut off part) of the light toward the forward direction.

The heat energy generated by the light source 12 is conducted to the vertical plate 20 through the horizontal plate 18, and finally conducted to the radiating fins 24 through the vertical plate 20. The radiation from the radiating fins 24 warms the ambient air of the radiating fins 24, and the air is thereby expanded.

The expanded ambient air rises between the adjacent radiating fins 24 toward the ceiling wall 1*c* of the housing case 1. The air between the adjacent radiating fins 24 in a plurality of the radiating fins 24 is continuously warmed and rises.

Figure 2:
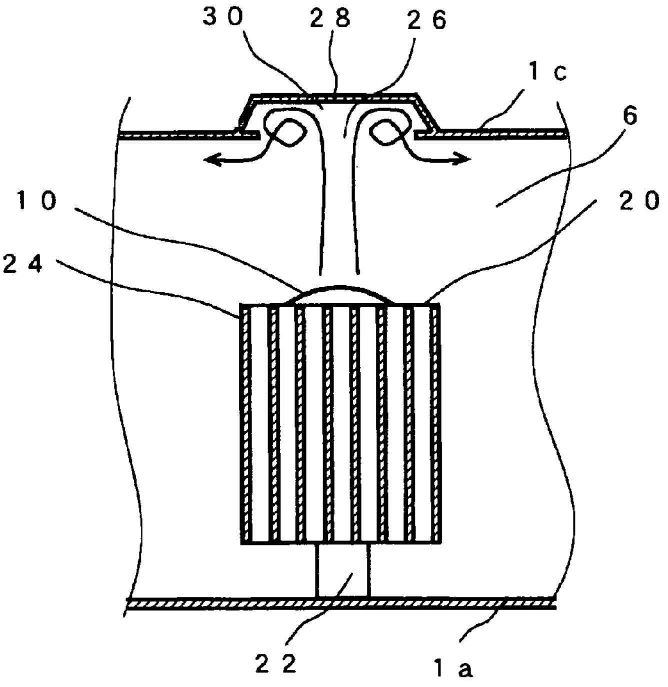
FIG. 2 is a view showing a cross section of the headlamp assembly along the A-A line shown in FIG. 1.

FIG. 2 is a view showing a cross section of the headlamp assembly along the A-A line shown in FIG. 1.

As shown in FIG. 2, the air which is warmed by the heat energy of the radiating fins 24 rises and then enters into the heat exchange chamber 30 through the ceiling hole 26 of the housing case 1 in the light chamber 6. In the heat exchange chamber 30, the heat exchange between the warmed air and the outside ambient air is executed through the cover unit 28. This heat exchange cools the warmed air in the heat exchange chamber 30. That is, the heat exchange between the warmed air and the outer ambient air of the light chamber 6 is executed while the warmed air flows along the inner surface of the cover unit 28.

As shown in FIG. 2, while the heat exchange is executed in the heat exchange chamber 30 through the cover unit 28, the warmed air flows to front, rear, right and left directions along the inner surface of the cover unit 28. When the warmed air reaches the outer peripheral part of the cover unit 28 after the heat exchange along the inner surface of the cover unit 28, the warmed air flows out from the heat exchange chamber 30 and into the inside of the light chamber 6 through the ceiling hole 26.

Figure 13:
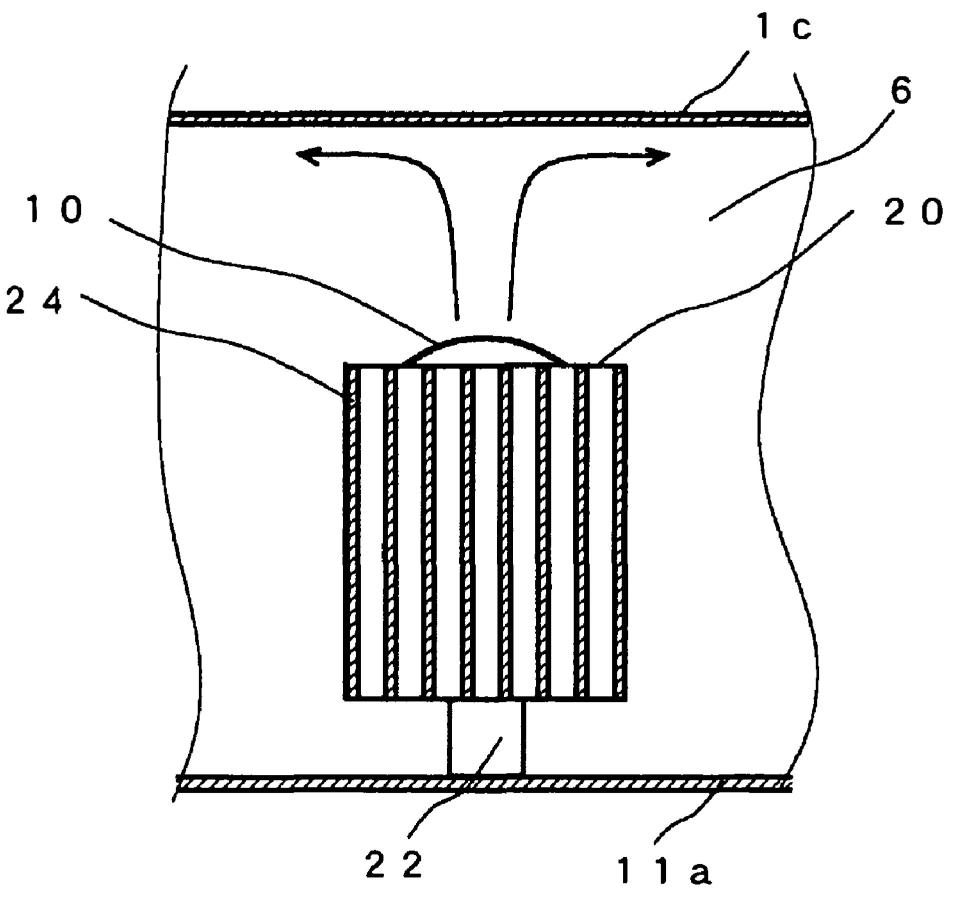
FIG. 13 (RELATED ART)
FIG. 13 is a view showing a cross section of a conventional headlamp assembly mounted to a vehicle.

When the warmed air in the heat exchange chamber 30 flows out into the light chamber 6 again after the warmed air from the radiating fins 24 side enters into the heat exchange chamber 30, the flow of the warmed air has a long cooling path. This long cooling path has an increased performance to execute the heat exchange between the air and the outside ambient air through the ceiling wall 1*c* when compared with a short cooling path provided from a ceiling wall of a flat type in a conventional headlamp assembly shown in FIG. 13. FIG. 13 is a view showing a cross section of a conventional headlamp assembly having a ceiling wall of a flat type.

The following different flows of air are generated in the light chamber 6:

(a) when the flow of warmed air out from the heat exchange chamber 30 into the light chamber 6 after the heat exchange is executed in the heat exchange chamber 30, the flow of the warmed air rolls due to the flow of warmed air which is rising from the radiating fins 24 side, and as a result a part of the flow of the warmed air enters the inside of the heat exchange chamber 30 again; and (b) The flow of the warmed air which is cooled through the cover unit 28 in the heat exchange chamber 30 by the heat exchange is pushed into the light chamber 6 by the flow of the warmed air which is rising from the radiating fins 24 side.

When the flow of the warmed air out from the heat exchange chamber 30 into the inside of the light chamber 6 collides with the flow of the warmed air which rises from the radiating fins 24 side, turbulence occurs around the heat exchange chamber 30 and the ceiling hole 26. The generated turbulence promotes the heat exchange between the warmed air and the inner wall of the cover unit 28 because the turbulence increases a temperature difference between the inner air (as the warmed air) of the heat exchange chamber 30 and the light chamber 6 and the outside ambient air of the housing case 1. This increases the radiating performance of the headlamp assembly.

The structure of the headlamp assembly according to the first embodiment having the above structure promotes the heat exchange between the warmed air in the light chamber 6 and the outside ambient air of the light chamber 6 and increases the radiating performance. It is thereby possible to suppress the temperature of the light source 12 and the radiating member 16 from being increased.

For example, when no turbulence occurs in the light chamber 6, temperature boundary layers are generated in the light chamber 6 so that the more the air is apart from the inner wall of the cover unit 28, the more the temperature of the air is increased.

On the other hand, the structure of the headlamp assembly according to the present invention can generate turbulence. The generated turbulence breaks and disturbs the temperature boundary layers of air. This contacts the warmed air to the inner wall of the cover unit 28. Because there is a large temperature difference between the warmed air and the surface of the inner wall of the cover unit 28, this structure of the headlamp assembly according to the present invention promotes the heat exchange and improves the radiating performance of the air warmed by the heat energy generated by the light source 12.

A part of the air which flows out from the heat exchange chamber 30 to the light chamber 6 flows toward the front lens cover 4 along the ceiling wall 1*c* of the housing case 1 as shown by the arrow shown in FIG. 1. The heat exchange is executed between the air in the light chamber 6 and the outside ambient air of the headlamp assembly through the rear wall 1*b*, the ceiling wall 1*c*, the side wall and the front lens cover 4. The heat exchange cools the air in the light chamber 6.

Further, the air then falls along the front lens cover 4, and then flows from the bottom side of the front lens cover 4 along the bottom wall 1*a* of the housing case 1, and then passes through the gap between the bottom surface of the shade 10 and the bottom wall 1*a* of the housing case 1. During the above air flow, the heat exchange is executed between the bottom wall 1*a* of the housing case 1 and the outside atmosphere of the headlamp assembly. The air is warmed by the heat energy of the radiating fins 24, and rises from the radiating fins 24 to the ceiling hole 26 of the housing case 1.

In addition, a part of the air flowing out from the heat exchange chamber 30 into the light chamber 6 then falls down along the side wall (not shown) and the rear wall 1*b* of the housing case 1, and then flows along the bottom wall 1*a* of the housing case 1. The air then flows to the radiating fins 24 again.

As described above, the air warmed by the heat energy of the radiating fins 24 flows along the ceiling wall 1*c* to the inner wall of the front lens cover 4, and further flows along the side walls (not shown) and the rear wall 1*b* of the housing case 1. The air which is cooled by the heat exchange previously described flows through the adjacent radiating fins 24 from the bottom wall 1*a* of the housing case 1. The circulation path of the air is generated in the light chamber 6.

Second Embodiment

A description will be given of the headlamp assembly according to a second embodiment of the present invention with reference to FIG. 3.

Figure 3:
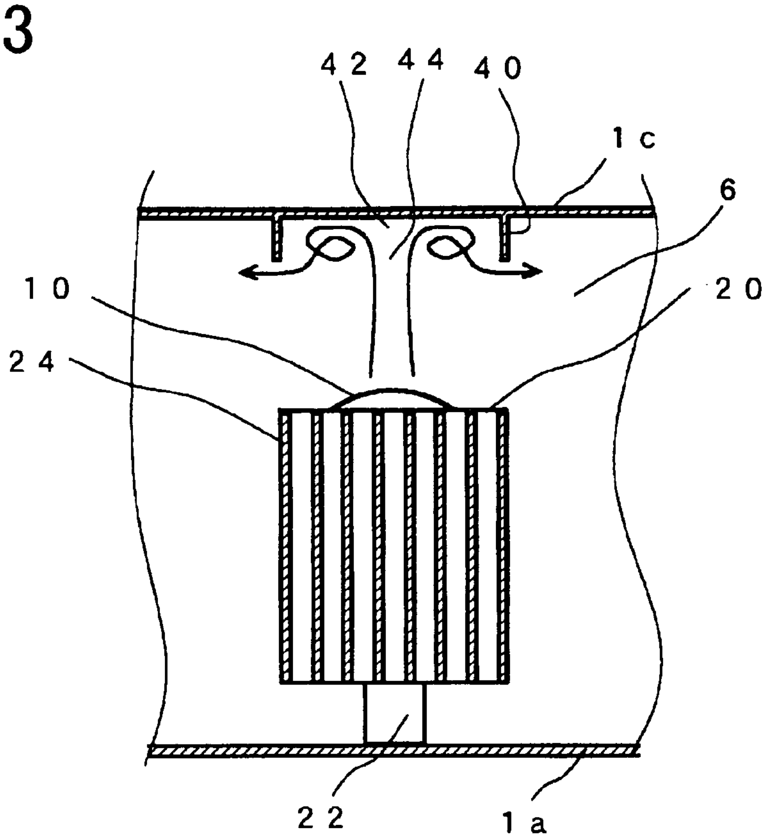
FIG. 3 is a view showing a cross section of a headlamp assembly mounted to a vehicle according to a second embodiment of the present invention, which corresponds to the cross section shown in FIG. 2 which shows the view along the A-A line shown in FIG. 1.

FIG. 3 is a view showing a cross section of the headlamp assembly mounted to a vehicle according to the second embodiment of the present invention. The cross section shown in FIG. 3 corresponds to the cross section shown in FIG. 2 which shows the view along the A-A line shown in FIG. 1. The same components of the headlamp assemblies according to the first and second embodiments shown in FIG. 1 to FIG. 3 will be referred with the same reference numbers and the explanation of them is omitted for brevity.

In the headlamp assembly according to the second embodiment, a rib part 40 is formed on the ceiling wall 1*c* of the housing case 1. The rib part 40 vertically projects toward the radiating fins 24 from the ceiling wall 1*c* with a predetermined height. The ceiling wall 1*c* of the housing case 1 and the rib part 40 are assembled in one body.

The rib part 40 has one of a circular shape, a rectangle shape, a hexagonal shape, etc. The rib part 40 has approximately the same size of the ceiling hole 26 formed in the ceiling part 1*a* according to the first embodiment shown in FIG. 1. The rib part 40 is placed above the radiating fins 24. A heat exchange chamber 42 is formed by the rib part 40 and the ceiling wall 1*c*. The heat exchange chamber 42 is open toward the bottom wall 1*a* of the housing case 1, namely, toward the radiating fins 24 through the opening part 44 which is surrounded by the bottom sides of the rib 40.

Similar to the effects of the headlamp assembly according to the first embodiment previously described, the air, which flows into the inside of the heat exchange chamber 42 from the light chamber 6, and then flows out into the light chamber 6, has a long flow path in which the heat exchange between the air in the heat exchange chamber 42 and the outside ambient air of the housing case 1 is executed through the ceiling wall 1*c* and the rib part 40.

Further, there are the following flows of air in the light chamber 6:

(a1) when the flow of warmed air out from the heat exchange chamber 42 into the light chamber 6 after the heat exchange is executed in the heat exchange chamber 42, the flow of the warmed air is rolled up by the flow of the warmed air which is rising from the radiating fins 24 side, and as a result a part of the flow of the warmed air enters the inside of the heat exchange chamber 42 again; and (b1) the flow of the warmed air which is cooled in the heat exchange chamber 42 through the ceiling wall 1*c* by the heat exchange is pushed into the light chamber 6 by the flow of the warmed air which is rising from the radiating fins 24 side.

When the flow of the warmed air out from the heat exchange chamber 42 to the inside of the light chamber 6 through the opening part 44 of the ceiling wall 1*c* collides with the flow of the warmed air which is rising from the radiating fins 24 side, turbulence occurs around the heat exchange chamber 42 and the opening part 44. The generated turbulence promotes the heat exchange between the warmed air and the inner wall of the ceiling wall 1*c* because the turbulence increases a temperature difference between the inner air (as the above warmed air) of the heat exchange chamber 42 and the light chamber 6 and the outside ambient air of the housing case 1. This increases the radiating performance of the headlamp assembly.

Third Embodiment

A description will be given of the headlamp assembly according to a third embodiment of the present invention with reference to FIG. 4.

Figure 4:
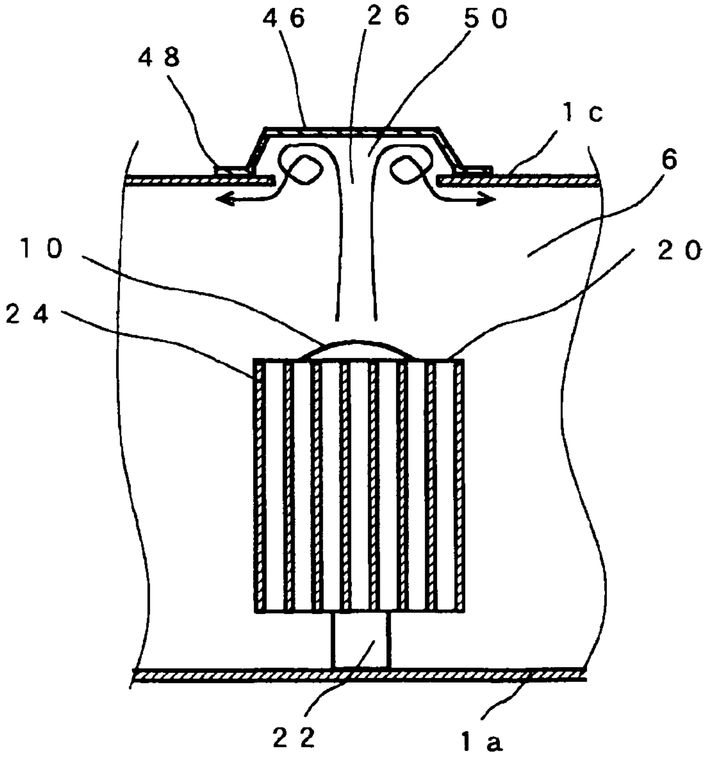
FIG. 4 is a view showing a cross section of a headlamp assembly mounted to a vehicle according to a third embodiment of the present invention, which corresponds to the cross section shown in FIG. 2 which shows the view along the A-A line shown in FIG. 1.

FIG. 4 is a view showing a cross section of the headlamp assembly mounted to a vehicle according to the third embodiment of the present invention. The cross section shown in FIG. 4 corresponds to the cross section shown in FIG. 2 which shows the view along the A-A line shown in FIG. 1. The same components of the headlamp assemblies according to the first and second embodiments shown in FIG. 1 to FIG. 4 will be referred with the same reference numbers and the explanation of them is omitted for brevity.

In the structure of the headlamp assembly according to the third embodiment, the ceiling hole 26 is formed in the ceiling wall 1*c* of the housing case 1. The ceiling hole 26 is covered with a cover unit 46. The cover unit 46 is a member which is not integrally formed with the housing case 1. The cover unit 46 has a flange part 48 of a ring shape which is placed in parallel to the ceiling wall 1*c*. The flange part 48 of the cover unit 46 is fixed to the outer surface of the ceiling wall 1*c* by brazing or welding.

Similar to the outer profile of the cover unit 28 according to the first embodiment, the outer profile of the cover unit 46 has a circular truncated cone shape which projects toward the upper side like a concave shape.

The inside of the cover unit 46 has a hollow shape. The cover unit 46 covers the ceiling hole 26 and has a size in which the heat exchange chamber 50 is formed in the inside of the cover unit 46. That is, the bottom part of the heat exchange chamber 50 is open toward the radiating fins 24 side through the ceiling hole 26.

Similar to the effects of the headlamp assembly according to the first embodiment previously described, the air, which flows into the inside of the heat exchange chamber 50 from the light chamber 6, and then flows out into the light chamber 6, has a long flow path in which the heat exchange between the air in the heat exchange chamber 50 and the outside ambient air of the housing case 1 is executed through the cover unit 46 and the ceiling wall 1*c*.

Still further, there are the following flows of air in the light chamber 6:

(a2) when the flow of warmed air out from the heat exchange chamber 50 into the light chamber 6 after the heat exchange is executed through the cover unit 46, the warmed air is rolled up by the flow of warmed air which is rising from the radiating fins 24 side, and as a result a part of the warmed air enters the inside of the heat exchange chamber 50 again; and (b2) The flow of the warmed air which is cooled through the cover unit 46 in the heat exchange chamber 50 by the heat exchange is pushed into the light chamber 6 by the flow of the warmed air which is rising from the radiating fins 24 side.

When the flow of the warmed air out from the heat exchange chamber 50 into the inside of the light chamber 6 collides with the flow of the warmed air which is rising from the radiating fins 24 side, turbulence occurs around the heat exchange chamber 50 and the ceiling hole 26. The generated turbulence promotes the heat exchange between the warmed air and the inner wall of the cover unit 46 because the turbulence increases a temperature difference between the inner air (as the warmed air) of the heat exchange chamber 50 and the light chamber 6 and the outside ambient air of the housing case 1. This increases the radiating performance of the headlamp assembly.

Because the cover unit 46 is the member which is not integrally formed with the housing case 1, it is possible to form them by different materials. For example, when the cover unit 46 is made of a member with a high heat conductivity which is higher than that of the housing case 1, it is possible to increase the radiation capability of the headlamp assembly.

Fourth Embodiment

A description will be given of the headlamp assembly according to a fourth embodiment of the present invention with reference to FIG. 5.

Figure 5:
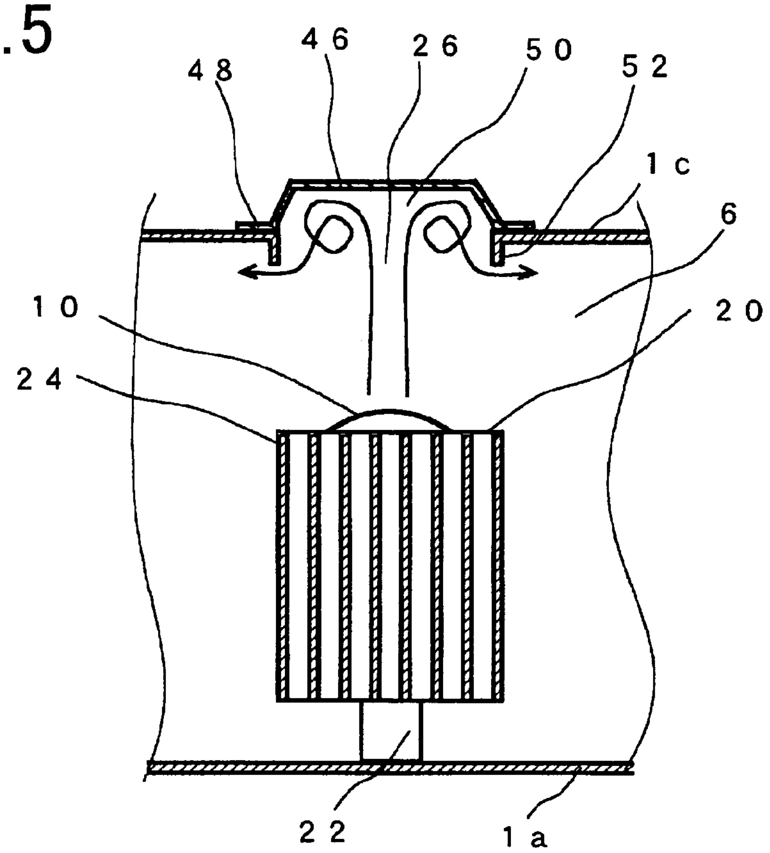
FIG. 5 is a view showing a cross section of a headlamp assembly mounted to a vehicle according to a fourth embodiment of the present invention, which corresponds to the cross section shown in FIG. 2 which shows the view along the A-A line shown in FIG. 1.

FIG. 5 is a view showing a cross section of the headlamp assembly mounted to a vehicle according to the fourth embodiment of the present invention. The cross section shown in FIG. 5 corresponds to the cross section shown in FIG. 2 which shows the view along the A-A line shown in FIG. 1.

The same components of the headlamp assemblies according to the third and fourth embodiments shown in FIG. 4 to FIG. 5 will be referred with the same reference numbers and the explanation of them is omitted for brevity.

In addition to the structure of the headlamp assembly according to the third embodiment shown in FIG. 4, the structure of the headlamp assembly according to the fourth embodiment has a rib part 52. The rib part 52 is formed around the ceiling hole 26 of the ceiling wall 1*c* of the housing case 1. The rib part 52 vertically projects toward the radiating fins 24 from the ceiling wall 1*c* with a predetermined height. The ceiling wall 1*c* of the housing case 1 and the rib part 52 are assembled in one body.

The cover unit 46 is a member which is not integrally formed with the housing case 1. The cover unit 46 has the flange part 48 of a ring shape which is placed in parallel to the ceiling wall 1*c*. The flange part 48 of the cover unit 46 is fixed to the outer surface of the ceiling wall 1*c* by brazing or welding.

For example, the rib part 52 has one of a circular shape, a rectangle shape, a hexagonal shape, etc. The rib part 52 has approximately the same size of the ceiling hole 26 formed in the ceiling part 1*a*. The rib part 52 is placed above the radiating fins 24. The heat exchange chamber 50 is formed by the rib part 52 and the cover unit 46. The heat exchange chamber 50 is open toward the bottom wall 1*a* of the housing case 1, namely, toward the radiating fins 24 through the ceiling hole 26 which is surrounded by the bottom sides of the rib 40.

It is thereby possible to form the air path which is longer than the air path in the structure of the third embodiment. This structure further promotes the generation of turbulence and increases the radiating capability of the headlamp assembly.

Fifth Embodiment

A description will be given of the headlamp assembly according to a fifth embodiment of the present invention with reference to FIG. 6.

Figure 6:
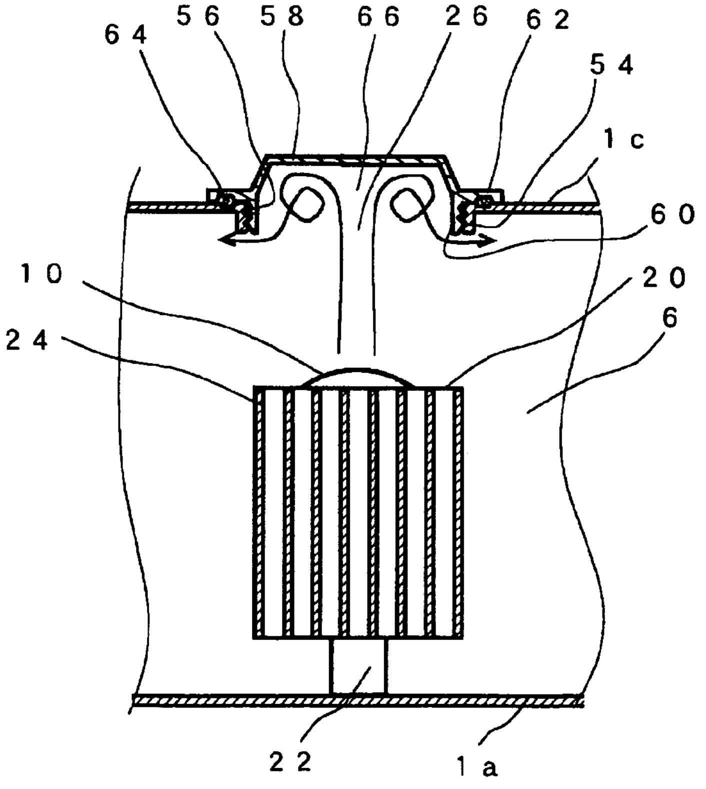
FIG. 6 is a view showing a cross section of a headlamp assembly mounted to a vehicle according to a fifth embodiment of the present invention, which corresponds to the cross section shown in FIG. 2 which shows the view along the A-A line shown in FIG. 1.

FIG. 6 is a view showing a cross section of the headlamp assembly mounted to a vehicle according to the fifth embodiment of the present invention. The cross section shown in FIG. 6 corresponds to the cross section shown in FIG. 2 which shows the view along the A-A line shown in FIG. 1. The same components of the headlamp assemblies according to the fifth and fourth embodiments shown in FIG. 6 to FIG. 5 will be referred with the same reference numbers and the explanation of them is omitted for brevity.

In the structure of the headlamp assembly according to the fifth embodiment, a rib part 54 is formed around the ceiling hole 26 of the ceiling wall 1*c* of the housing case 1. The rib part 54 vertically projects toward the radiating fins 24 from the ceiling wall 1*c* with a predetermined height. The ceiling wall 1*c* of the housing case 1 and the rib part 54 are assembled in one body. A female screw part 56 is formed on the inner periphery of the rib part 54.

A cover unit 58 is a member which is not integrally formed with the housing case 1. The cover unit 58 has a flange part 62 of a ring shape which is placed in parallel to the ceiling wall 1*c*. The flange part 62 of the cover unit 58 is fixed to the outer surface of the ceiling wall 1*c* through a seal member 64. The ceiling hole 26 of the ceiling wall 1*c* is covered with the cover unit 58 through the seal member 64.

The cover unit 58 has a cylindrical rib part 60. A male screw part is formed on the outer periphery of the cylindrical rib part 60. The male screw part of the cover unit 58 is screwed to the female screw part 56 of the rib part 54. The cover unit 58 is tightly fixed to the ceiling wall 1*c* of the housing case 1 through the seal member 64 by the female screw part 56 of the rib part 54 and the male screw part of the cylindrical rib part 60.

Similar to the outer profile of the cover unit 28, the outer profile of the cover unit 58 has a circular truncated cone shape which projects toward the upper side like a concave shape. The ceiling hole 26 of the ceiling wall 1*c* is sealed with the cover unit 58. The cover unit 58 has a size in which a heat exchange chamber 66 is formed in the inside of the cover unit 58. That is, the bottom part of the heat exchange chamber 66 is open toward the radiating fins 24 side.

Similar to the effects of the headlamp assembly according to the first embodiment previously described, the air, which flows into the inside of the heat exchange chamber 66 from the light chamber 6, and then flows out into the light chamber 6, has a long flow path in which the heat exchange between the air in the heat exchange chamber 66 and the outside ambient air of the housing case 1 is executed through the cover unit 58 and the ceiling wall 1*c*. Thus, in the structure of the headlamp assembly according to the fifth embodiment, the air flow path is more increased by the presence of the rib part 54 and the cylindrical rib part 60.

Still further, there are the following flows of air in the light chamber 6:

(a3) when the flow of warmed air out from the heat exchange chamber 66 into the light chamber 6 after the heat exchange is executed in the heat exchange chamber 66, the warmed air is rolled up by the flow of warmed air which is rising from the radiating fins 24 side, and as a result a part of the warmed air enters the inside of the heat exchange chamber 66 again; and (b3) the flow of the warmed air which is cooled in the heat exchange chamber 66 by the heat exchange is pushed into the light chamber 6 by the flow of the warmed air which is rising from the radiating fins 24 side.

When the flow of the warmed air which flows out from the heat exchange chamber 66 to the inside of the light chamber 6 collides with the flow of the warmed air which is rising from the radiating fins 24 side, turbulence occurs around the heat exchange chamber 66 and the ceiling hole 26. The presence of the rib part 54 and the cylindrical rib part 60 further promote the generation of the turbulence. The generated turbulence promotes the heat exchange between the warmed air and the inner wall of the cover unit 58 and the ceiling wall 1*c* because the turbulence increases a temperature difference between the inner air (as the warmed air) of heat exchange chamber 66 and the light chamber 6 and the outside ambient air of the housing case 1. This increases the radiating performance of the headlamp assembly.

Similar to the structure of the headlamp assembly according to the fourth embodiment, because the cover unit 58 is the member which is not integrally formed with the housing case 1, it is possible to form them by different materials. For example, when the cover unit 58 is made of a member with a high heat conductivity which is higher than that of the housing case 1, it is possible to increase the radiation capability of the headlamp assembly.

Sixth Embodiment

A description will be given of the headlamp assembly according to a sixth embodiment of the present invention with reference to FIG. 7, and FIG. 8A, FIG. 8B and FIG. 8C.

Figure 7:
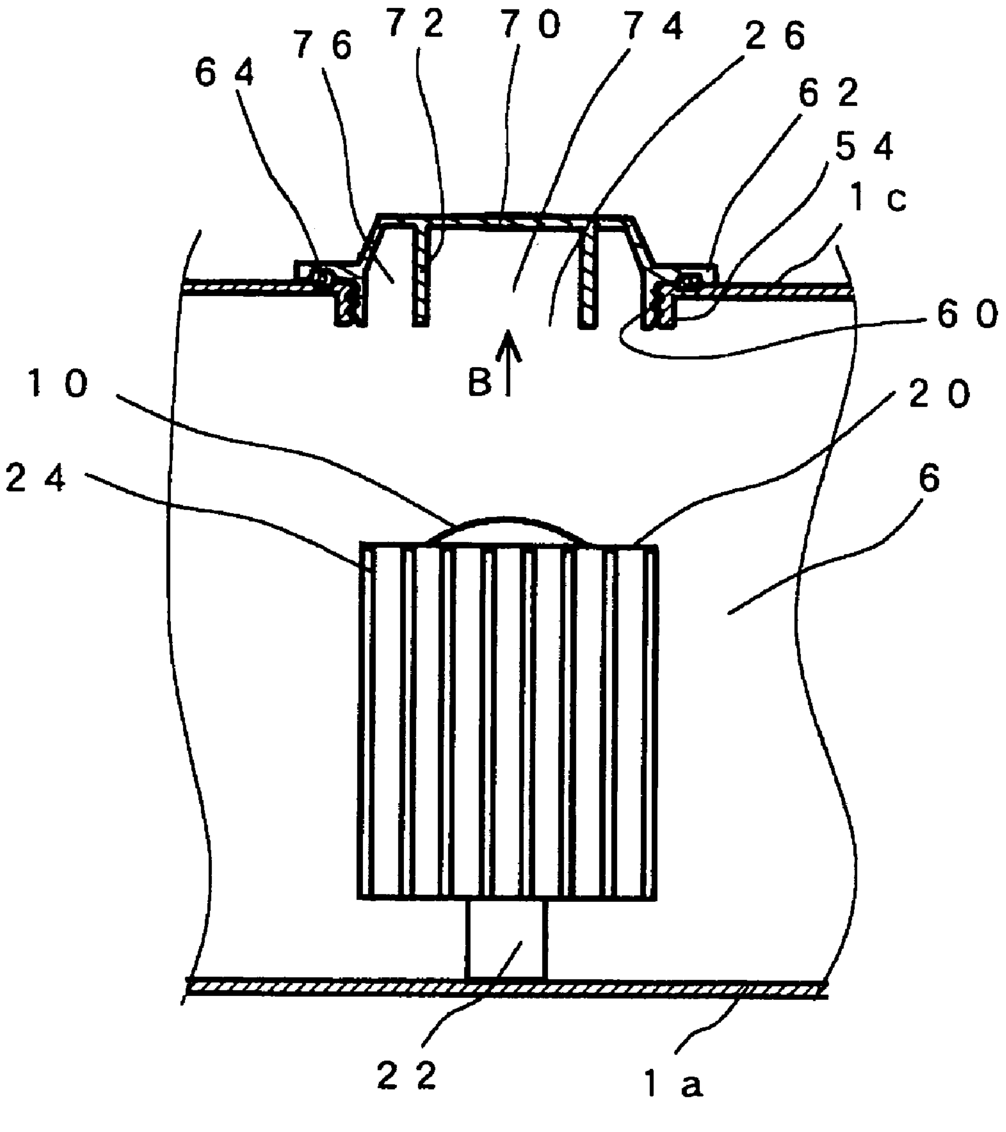
FIG. 7 is a view showing a cross section of a headlamp assembly mounted to a vehicle according to a sixth embodiment of the present invention, which corresponds to the cross section shown in FIG. 2 which shows the view along the A-A line shown in FIG. 1.
Figure 8A:
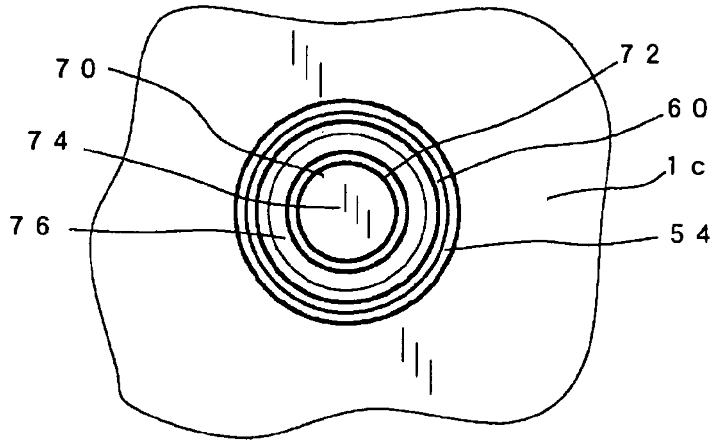
FIG. 8A is a view showing a cross section of a secondary rib part in the headlamp assembly when observed along the arrow B shown in FIG. 7.

FIG. 7 is a view showing a cross section of the headlamp assembly mounted to a vehicle according to the sixth embodiment of the present invention. The cross section shown in FIG. 7 corresponds to the cross section shown in FIG. 2 which shows the view along the A-A line shown in FIG. 1. FIG. 8A is a view showing a cross section of the secondary rib part 72 in the headlamp assembly when observed along the arrow B shown in FIG. 7.

The same components of the headlamp assemblies according to the sixth and fifth embodiments shown in FIG. 7 and FIG. 6 will be referred with the same reference numbers and the explanation of them is omitted for brevity.

In the headlamp assembly according to the sixth embodiment, a cover unit 70 has a primary rib part 60 and a secondary rib part 72. The primary rib part 60 has a cylindrical shape, similar to the cylindrical rib part 60 of the cover unit 58 according to the fifth embodiment shown in FIG. 6.

Similar to the primary rib part 60, the secondary rib part 72 has a cylindrical shape. As shown in FIG. 8A, the secondary rib part 72 is smaller in diameter than the primary rib part 60. The secondary rib part 72 vertically projects toward the radiating fins 24 from the cover unit 70 with a predetermined height. The ceiling wall 1*c* of the housing case 1 and the rib part 54 are assembled in one body.

The secondary rib part 72 has the same height of the primary rib part 60 when measured from the cover unit 70 or from the bottom wall 1*a* of the housing case 1. In other words, it is so formed for the front end of the primary rib part 60 and the front end of the secondary rib part 72 have the same height measured from the bottom wall 1*a* of the housing case 1.

The structure of the primary rib part 60 and the secondary rib part 72 of the cover unit 70 forms a heat exchange chamber 74 at a central part of the cover unit 70 and a heat exchange sub-chamber 76 around the outer periphery of the heat exchange chamber 74. That is, the heat exchange sub-chamber 76 surrounds the heat exchange chamber 74 at the central part of the cover unit 70. As shown in FIG. 7 and FIG. 8A the heat exchange chamber 74 has a cylindrical shape. The heat exchange sub-chamber 76 has a doughnut shape with a hollow and is open toward the radiating fins 24. The heat exchange sub-chamber 76 is formed between the primary rib part 60 and the secondary rib part 72 of a cylindrical shape. The heat exchange chamber 74 and the heat exchange sub-chamber 76 are open toward the bottom wall 1*c* and the radiating fins 24.

Figure 8B:
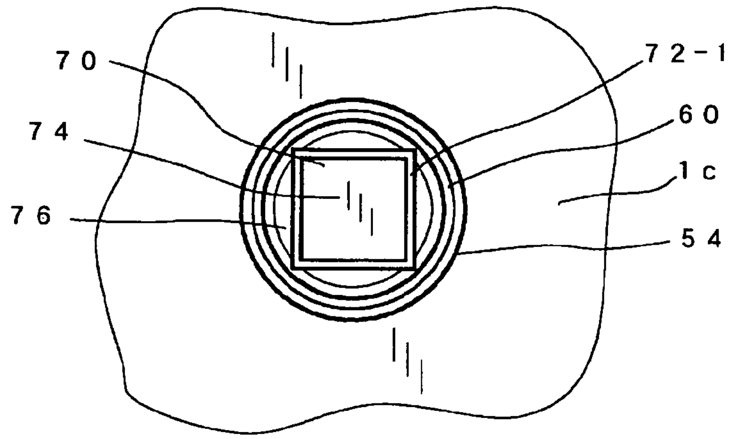
FIG. 8B is a view showing a cross section of the secondary rib part having other shape when observed along the arrow B shown in FIG. 7.
Figure 8C:
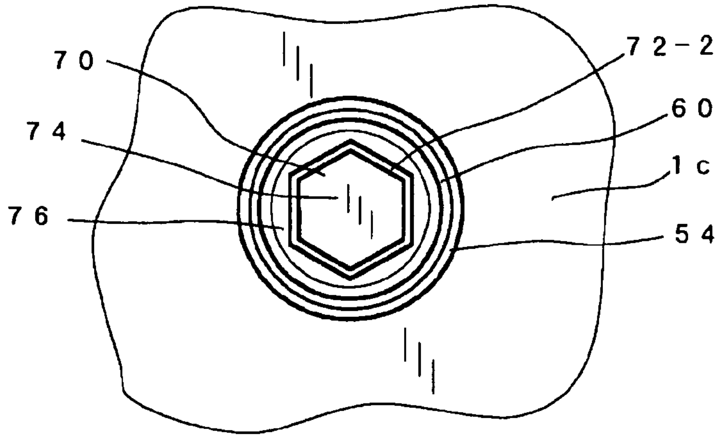
FIG. 8C is a view showing a cross section of the secondary rib part having other shape when observed along the arrow B shown in FIG. 7.

FIG. 8B is a view showing a cross section of the secondary rib part 72-1 having other shape when observed along the arrow B shown in FIG. 7. FIG. 8C is a view showing a cross section of the secondary rib part 72-2 having other shape when observed along the arrow B shown in FIG. 7. It is possible for the secondary rib part to have one of:

(s1) a circular cylindrical shape designated by the reference number 72 shown in FIG. 8A;

(s2) a rectangle cylindrical shape designated by the reference number 72-1 shown in FIG. 8B; and (s3) a hexagonal cylindrical shape designated by the reference number 72-2 shown in FIG. 8C.

Similar to the effects of the headlamp assembly according to the first embodiment previously described, the air, which flows into the inside of the heat exchange chamber 74 and the heat exchange sub-chamber 76 from the light chamber 6, and then flows out into the light chamber 6, has a long flow path in which the heat exchange between the air in the heat exchange chamber 74 and the heat exchange sub-chamber 76 and the outside ambient air of the housing case 1 is executed through the cover unit 70 and the ceiling wall 1*c*. Thus, in the structure of the headlamp assembly according to the sixth embodiment, the air flow path is more increased by the presence of the primary rib part 60 and the second rib part 72 of a cylindrical shape.

Still further, there are the following flows of air in the light chamber 6:

(a4) when the flow of warmed air out from the heat exchange chamber 74 and the heat exchange sub-chamber 76 into the light chamber 6 after the heat exchange is executed in the heat exchange chamber 74 and the heat exchange sub-chamber 76, the warmed air is rolled up by the flow of warmed air which is rising from the radiating fins 24 side, and as a result a part of the warmed air enters the inside of the heat exchange chamber 74 and the heat exchange sub-chamber 76 again; and (b4) the flow of the warmed air which is cooled through the cover unit 70 in the heat exchange chamber 74 and the heat exchange sub-chamber 76 is pushed into the light chamber 6 by the flow of the warmed air which is rising from the radiating fins 24 side.

When the flow of the warmed air out from the heat exchange chamber 74 and the heat exchange sub-chamber 76 into the inside of the light chamber 6 collides with the flow of the warmed air which is rising from the radiating fins 24 side, turbulence occurs around the heat exchange chamber 74, the heat exchange sub-chamber 76 and the ceiling hole 26. The presence of the primary rib part 60 and the secondary rib part 72 further promote the generation of the turbulence. The generated turbulence promotes the heat exchange between the warmed air and the inner wall of the cover unit 70 and the ceiling wall 1*c* because the turbulence increases a temperature difference between the inner air (as the warmed air) of the heat exchange chamber 74, the heat exchange sub-chamber 76 and the light chamber 6 and the outside ambient air of the housing case 1. This increases the radiating performance of the headlamp assembly.

Similar to the structure of the headlamp assembly according to the fourth embodiment, because the cover unit 70 according to the fifth embodiment is the member which is not integrally formed with the housing case 1, it is possible to form them by different materials. For example, when the cover unit 70 is made of a member with a high heat conductivity which is higher than that of the housing case 1, it is possible to increase the radiation capability of the headlamp assembly.

Seventh Embodiment

A description will be given of the headlamp assembly according to a sixth embodiment of the present invention with reference to FIG. 9 and FIG. 10.

Figure 9:
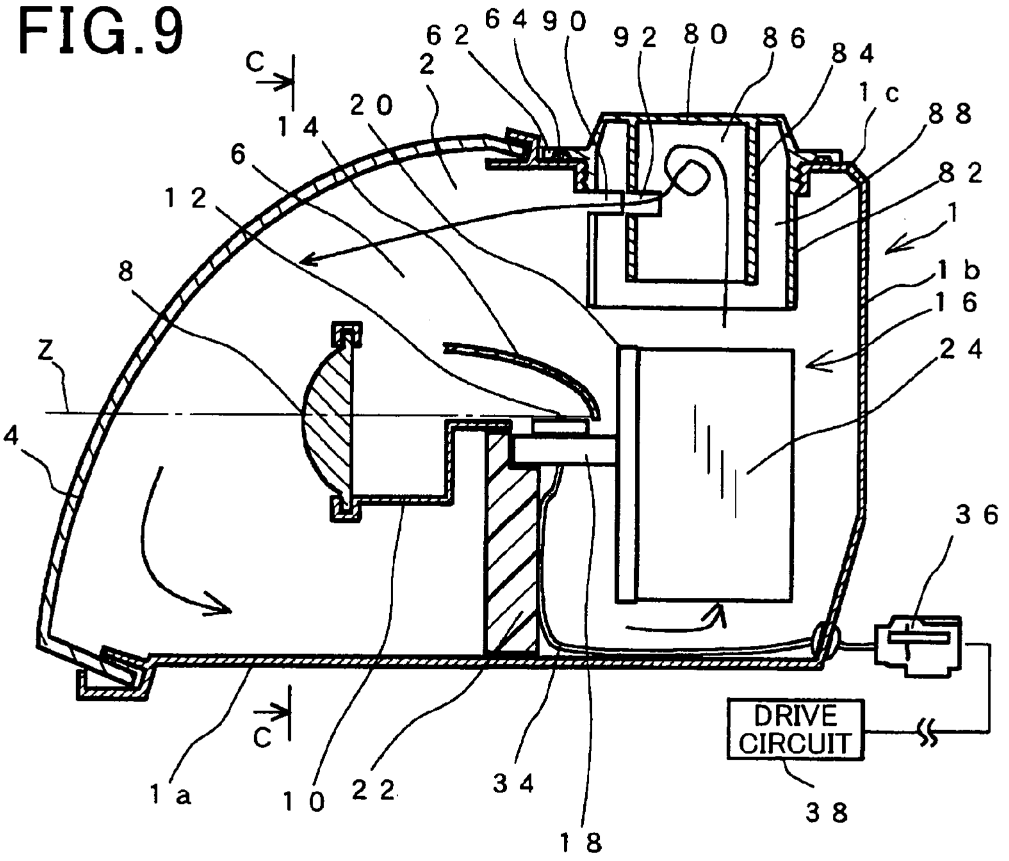
FIG. 9 is a schematic view showing a vertical cross section of a headlamp assembly mounted to a vehicle according to a seventh embodiment of the present invention.

FIG. 9 is a schematic view showing a vertical cross section of a headlamp assembly mounted to a vehicle according to the seventh embodiment of the present invention. FIG. 10 is a view showing a cross section of the headlamp assembly long the C-C line shown in FIG. 9.

In the headlamp assembly according to the seventh embodiment, a cover unit 80 has a primary rib part 82 of a cylindrical shape. The primary rib part 82 of a cylindrical shape is open toward the radiating fins 24 and the bottom wall 1*a* of the housing case 1. A male screw part is formed on the outer periphery of the primary rib part 82 of a cylindrical shape in the cover unit 80. The male screw part formed on the primary rib part 82 corresponds in position to the female screw part formed on the rib part of the ceiling wall 1*c*, similar to the female screw part 56 of the rib part 54 according to the fifth embodiment shown in FIG. 6.

As shown in FIG. 9, the male screw part formed on the primary rib part 82 is screwed to the female screw part formed on the rib part of the ceiling wall 1*c*. The primary rib part 82 of a cylindrical shape having the male screw part is placed near and above the radiating fins 24. The primary rib part 82 of a cylindrical shape is open toward the radiating fins 24 and vertically projects toward the radiating fins 24.

In addition, a secondary rib part 84 is formed in the inside of the primary rib part 82 with a predetermined gap. Similar to the primary rib part 82, the secondary rib part 84 has a cylindrical shape. This gap forms a heat exchange sub-chamber 88. The secondary rib part 84 vertically projects toward the radiating fins 24 from the cover unit 80. The secondary rib part 84 is open toward the radiating fins 24. In particular, the height of the secondary rib part 84, when measured from the bottom wall 1*a* of the housing case 1, is higher than the height of the primary rib part 82.

A heat exchange chamber 86 is formed at a central part of the cover unit 80. The secondary rib part 84 surrounds the outer periphery of the heat exchange chamber 86. The heat exchange sub-chamber 88 is formed between the primary rib part 82 and the secondary rib part 84 of a cylindrical shape. The heat exchange chamber 86 and the heat exchange sub-chamber 88 are open toward the radiating fins 24 when observed from the ceiling hole 26 of the ceiling wall 1*c* of the housing case 1.

A ventilation hole 90 is formed in the primary rib part 82 of a cylindrical shape so that the ventilation hole 90 faces the front lens cover 4 at the front end of the headlamp assembly according to the seventh embodiment. Further, a ventilation hole 92 is further formed in the secondary rib part 84 of a cylindrical shape so that ventilation hole 92 and the ventilation hole 90 face the front lens cover 4 at the front end of the headlamp assembly. That is, it is place so that the ventilation hole 90 faces the ventilation hole 92.

Similar to the effects of the headlamp assembly according to the first embodiment previously described, the air, which flows into the inside of the heat exchange chamber 86 and the heat exchange sub-chamber 88 from the light chamber 6, and then flows out into the light chamber 6, has a long flow path in which the heat exchange between the air in the heat exchange chamber 86, the heat exchange sub-chamber 88 and the outside ambient air of the housing case 1 is executed through the cover unit 80 and the ceiling wall 1*c*. Thus, in the structure of the headlamp assembly according to the seventh embodiment, the air flow path is more increased by the presence of the primary rib part 82 of a cylindrical shape and the secondary rib part 84.

Still further, there are the following flows of air in the light chamber 6:

(a5) when the flow of warmed air out from the heat exchange chamber 86 and the heat exchange sub-chamber 88 into the light chamber 6 after the heat exchange is executed in the heat exchange chamber 86 and the heat exchange sub-chamber 88, the warmed air is rolled up by the flow of warmed air which is rising from the radiating fins 24 side, and as a result a part of the warmed air enters the inside of the heat exchange chamber 86 and the heat exchange sub-chamber 88 again; and (b5) the flow of the warmed air which is cooled in the heat exchange chamber 86 and the heat exchange sub-chamber 88 by the heat exchange is pushed into the light chamber 6 by the flow of the warmed air which is rising from the radiating fins 24 side.

Figure 10:
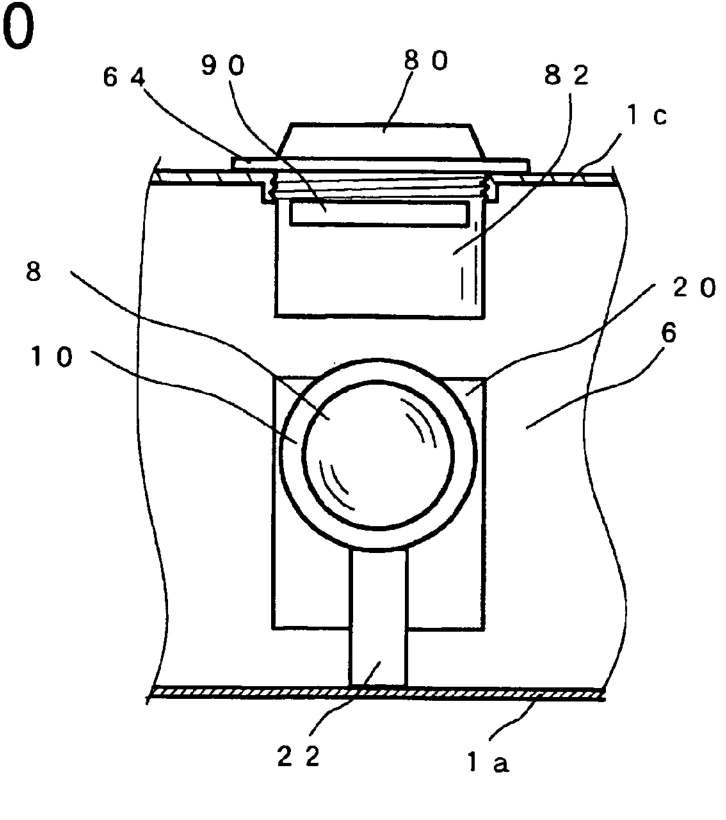
FIG. 10 is a view showing a cross section of the headlamp assembly long the C-C line shown in FIG. 9.

When the flow of the warmed air out from the heat exchange chamber 86 and the heat exchange sub-chamber 88 into the inside of the light chamber 6 after the heat exchange collides with the flow of the warmed air which is rising from the radiating fins 24 side, turbulence occurs around the heat exchange chamber 86, the heat exchange sub-chamber 88 and the ceiling hole 26 (which corresponds to the female screw part formed in the rib part of the ceiling wall 1*c*, but is not clearly shown in FIG. 9 and FIG. 10). The presence of the primary rib part 82 and the secondary rib part 84 further promote the generation of the turbulence. The generated turbulence promotes the heat exchange between the inner air (as the warmed air) and the inner wall of the cover unit 80 and the ceiling wall 1*c* because the turbulence increases a temperature difference between the inner air of the light chamber 6 and the outside air of the housing case 1. This increases the radiating performance of the headlamp assembly.

Still further, the warmed air flows from the heat exchange chamber 86 and the heat exchange sub-chamber 88 through the ventilation hole 90 and the ventilation hole 92 toward the lend cover 4. The warmed air then flows along the inner wall of the front lens cover 4 to the bottom wall 1*a* of the housing case 1. The warmed air is cooled at the front lens cover 4 by the heat exchange between the warmed air and the outside ambient air. The cooled air then flows along the bottom wall 1*a* of the housing case 1. The cooled air then rises to the radiating fins 24 again. The circulation of the air is formed in the light chamber 6.

In particular, because the outside air directly blows the outside surface of the front lens cover 4 when the motor vehicle is running, the heat exchange between the warmed air in the inside of the light chamber 6 and the outside air, the circulation path of convention of the inside air is made at the inside of the front lens cover 4, the heat exchange is promoted and the warmed air is thereby cooled.

When the vehicle drives on a road in cold weather, snow and ice are often attached on the front lens cover 4 of the headlamp assembly. Because the inner air of the front lens cover 4 and the housing case 1 is warmed by the heat energy generated by the light source 12, the snow and ice attached on the outside surface of the head cover 4 are heated and then melted. This maintains the radiation of the light from the headlamp assembly toward the front of the running vehicle.

Similar to the structure of the cover unit 46 according to the third and fourth embodiments shown in FIG. 4 and FIG. 5, because the cover unit 80 according to the seventh embodiment is the member which is not integrally formed with the housing case 1, it is possible to form them by different materials. For example, when the cover unit 80 is made of a member with a high heat conductivity which is higher than that of the housing case 1, it is possible to increase the radiation capability of the headlamp assembly.

Still further, similar to the structure of the primary rib part 82 of a cylindrical shape according to the seventh embodiment, it is possible for each of the rib parts 40, 52, 54 and 60 to have a long length toward the radiating fins 24 and further have a ventilation hole through which warmed air flows out toward the front lens cover 4.

Eighth Embodiment

A description will be given of the headlamp assembly according to an eighth embodiment of the present invention with reference to FIG. 11 and FIG. 12.

Figure 11:
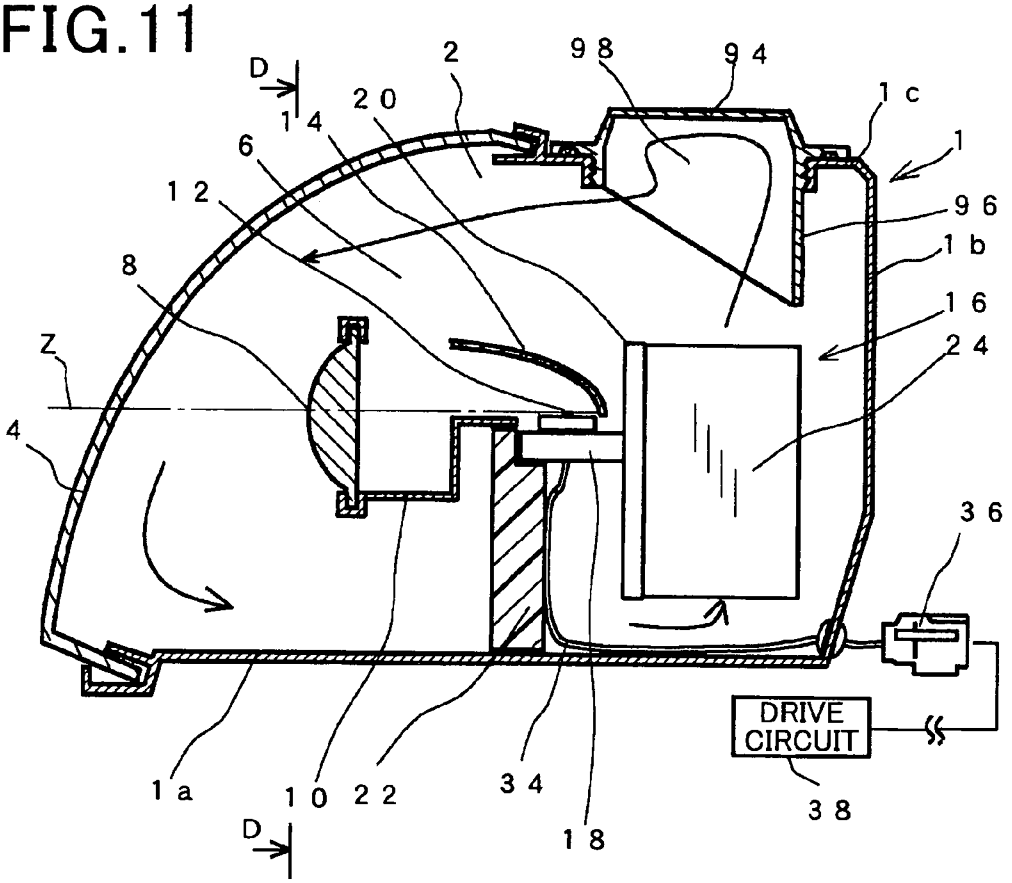
FIG. 11 is a schematic view showing a vertical cross section of a headlamp assembly mounted to a vehicle according to an eighth embodiment of the present invention.

FIG. 11 is a schematic view showing a vertical cross section of the headlamp assembly mounted to a vehicle according to the eighth embodiment of the present invention. FIG. 12 is a view showing a cross section of the headlamp assembly long the D-D line shown in FIG. 11.

The headlamp assembly according to the eighth embodiment has a cover unit 94. As shown in FIG. 11 and FIG. 12, this cover unit 94 has a male screw part and a rib part 96 of a cylindrical shape. That is, the male screw part is formed on the cover unit 94 in addition to the structure of the headlamp assembly according to the fifth embodiment shown in FIG. 6. The rib part 96 of the cover unit 94 vertically projects toward the radiating fins 24 from the ceiling wall 1*c* with a predetermined height.

The bottom part (which faces the radiating fins 24 side) of the rib part 96 of a cylindrical shape has an oblique shape. The oblique shape of the bottom part of the rib part 96 is open toward the front lens cover 4 side. A front part of the oblique part of the rib part 96 in the cover unit 94 projects toward the front lens cover 4 and is apart from the radiating fins 24. A rear part of the oblique part of the rib part 96 in the cover unit 94 is the nearest to the radiating fins 24.

A heat exchange chamber 98 is formed in the rib part 96 of the cover unit 94. That is, as shown in FIG. 11 and FIG. 12, the rib part 96 of a cylindrical shape accommodates the heat exchange chamber 98 so that the heat exchange chamber 98 is obliquely open toward a front bottom side and the front lens cover 4 in the light chamber 6.

Similar to the effects of the headlamp assembly according to the first embodiment previously described, the air, which flows into the inside of the heat exchange chamber 98 from the light chamber 6, and then flows out into the light chamber 6, has a long flow path in which the heat exchange between the air in the heat exchange chamber 98 and the outside ambient air of the housing case 1 is executed through the ceiling wall 1*c* and the cover unit 94 having the rib part 96 of a cylindrical shape. That is, it is possible for the rib part 96 of a cylindrical shape to further increase the air flow path.

Still further, there are the following flows of air in the light chamber 6:

(a6) when the flow of warmed air out from the heat exchange chamber 98 into the light chamber 6 after the heat exchange, the flow of the warmed air is rolled up by the flow of warmed air which is rising from the radiating fins 24 side, and as a result a part of the warmed air enters the inside of the heat exchange chamber 98 again; and (b5) the flow of the warmed air which is cooled through the cover unit 94 by the heat exchange in the heat exchange chamber is pushed into the light chamber 6 by the flow of the warmed air which is rising from the radiating fins 24 side.

Figure 12:
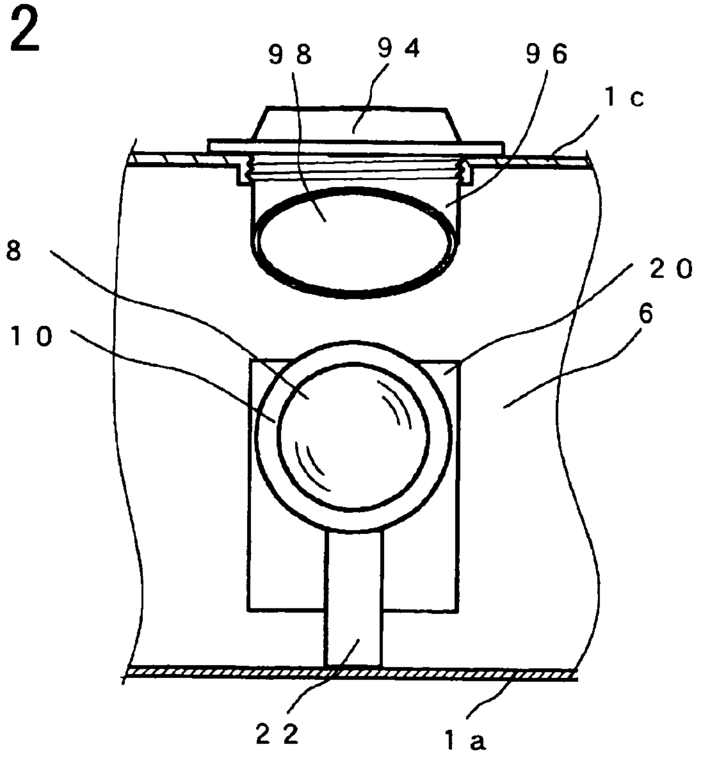
FIG. 12 is a view showing a cross section of the headlamp assembly long the D-D line shown in FIG. 11.

When the flow of the warmed air out from the heat exchange chamber 98 into the inside of the light chamber 6 collides with the flow of the warmed air which is rising from the radiating fins 24 side, turbulence occurs around the heat exchange chamber 98 and the ceiling hole 26 (which corresponds to the female screw part formed in the rib part of the ceiling wall 1*c*, but is not clearly shown in FIG. 11 and FIG. 12). The presence of the rib part 96 of a cylindrical shape further promote the generation of the turbulence. The generated turbulence promotes the heat exchange between the inner air (as the warmed air) and the inner wall of the cover unit 94 having the rib part 96 of a cylindrical shape and the ceiling wall 1*c* because the turbulence increases a temperature difference between the inner air of the light chamber 6 and the outside air of the housing case 1. This increases the radiating performance of the headlamp assembly.

In particular, the rib part 96 of a cylindrical shape has an oblique part which is open toward the front bottom side and the front lens cover 4. The warmed air flows from the heat exchange chamber 98 toward the front bottom side and the front lens cover 4. The warmed air flows out from the heat exchange chamber 98 and then flows along the inner wall of the front lens cover 4. After the heat exchange between the warmed air and the outside ambient air of the front lens cover 4, the cooled air flows along the bottom wall 1*a* of the housing case 1 to the radiating fins 24 again. This makes the convection of air in the light chamber 6.

In particular, because the outside air directly blows the outside surface of the front lens cover 4 when the motor vehicle is running, the heat exchange between the warmed air in the inside of the light chamber 6 and the outside air, the circulation path of convention of the inside air is made at the inside of the front lens cover 4, the heat exchange is promoted and the warmed air is thereby cooled. When the vehicle drives on a road in a cold district, snow and ice are often attached on the front lens cover 4 of the headlamp assembly. Because the inner air of the front lens cover 4, namely, in the light chamber 6 is warmed by the heat energy generated by the light source 12, the snow and ice attached on the outside surface of the head cover 4 are heated and then melted. This maintains the radiation of the light from the headlamp assembly toward the front of the running vehicle.

Similar to the structure of the cover unit 46 according to the fourth embodiment shown in FIG. 5, because the cover unit 94 according to the eighth embodiment is the member which is not integrally formed with the housing case 1, it is possible to form them by different materials. For example, when the cover unit 94 is made of a member with a high heat conductivity which is higher than that of the housing case 1, it is possible to increase the radiation capability of the headlamp assembly.

Still further, similar to the structure of the rib part 96 of a cylindrical shape according to the eighth embodiment, it is possible for each of the rib parts 40, 52, 54 and 60 to have a long length toward the radiating fins 24 and further have an oblique shape which is open toward the front lens cover 4.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A headlamp assembly for a motor vehicle comprising:

a housing case having a ceiling wall and a bottom wall, a front part of the housing case being open;

a lens cover fitted to the front part of the housing case, and the lens cover and the housing case forming a light chamber having a closed space;

a light source, placed in the light chamber, for emitting light;

a projection lens, placed in the light chamber, for projecting the light emitted from the light source toward a front side of the headlamp assembly;

a radiating member placed in the light chamber, comprised of a plurality of radiating fins for radiating heat energy generated by the light source; and a heat exchange chamber formed in the ceiling wall of the housing case above the radiating member arranged in the light chamber, the heat exchange chamber being open toward the bottom wall of the light chamber in order to communicate with expanded air rising from the plurality of radiating fins to enter the heat exchange chamber and to execute heat exchange between the expanded air rising from the light chamber and external air through the ceiling wall in the heat exchange chamber.

2. The headlamp assembly according to claim 1, wherein the heat exchange chamber is formed in the ceiling wall of the housing case so that the heat exchange chamber has a convex shape toward an upper side of the housing case.

3. The headlamp assembly according to claim 1, wherein the heat exchange chamber is formed by a rib part which projects from the ceiling wall of the housing case toward the bottom wall of the housing case.

4. The headlamp assembly according to claim 1, wherein the ceiling wall of the housing case has a ceiling hole, and the ceiling hole is covered with a cover unit in order to form the heat exchange chamber so that the heat exchange chamber has a convex shape toward an upper side of the housing case.

5. The headlamp assembly according to claim 4, wherein the cover unit has a heat conductivity which is higher than a heat conductivity of the housing case.

6. The headlamp assembly according to claim 4, wherein a rib part is formed around the ceiling hole of the housing case, and the rib part projects from the ceiling wall of the housing case toward the bottom wall of the housing case.

7. The headlamp assembly according to claim 6, wherein a seal member is placed between the cover unit and the housing case, and a male screw part is formed on an outer periphery of the cover unit, and a female screw part is formed on an inner periphery of the rib part formed around the ceiling hole of the housing case, and the male screw part of the cover unit is screwed to the female screw part of the rib part of the housing case, and the cover unit and the rib part of the housing case are joined by the male screw part and the female screw part.

8. The headlamp assembly according to claim 4, wherein the heat exchange chamber is comprised of a central heat exchange chamber and a heat exchange sub-chamber, and the central heat exchange chamber is formed at a central part of the heat exchange chamber, and the heat exchange sub-chamber is formed around the central heat exchange chamber and is open toward the bottom wall of the light chamber.

9. The headlamp assembly according to claim 3, wherein an air flow hole is formed on the outer periphery of the rib part and is open toward the front side of the headlamp assembly.

10. The headlamp assembly according to claim 3, wherein a bottom part of the rib part which projects from the ceiling wall of the housing case has an oblique shape and is open toward a front bottom side of the light chamber.

11. The headlamp assembly according to claim 1, wherein the heat exchange chamber is capable of temporarily blocking warmed air rising from a radiating fin side in order to execute heat exchange between the warmed air and outside ambient air through the housing case.

12. The headlamp assembly according to claim 4, wherein the heat exchange chamber is capable of temporarily blocking warmed air rising from a radiating fin side in order to execute heat exchange between the warmed air and outside ambient air through the cover unit.

13. The headlamp assembly according to claim 8, wherein the heat exchange sub-chamber has a cross section of one of a circular shape, a rectangle shape and a hexagonal shape.

14. A headlamp assembly for a motor vehicle comprising:

a housing case, a front part of the housing case being open;

a lens cover fitted to the front part of the housing case, and the lens cover and the housing case forming a light chamber defining a closed space;

a light source disposed in the light chamber emitting light;

a projection lens disposed in the light chamber projecting the light emitted from the light source toward a front side of the headlamp assembly;

a radiating member disposed in the light chamber, the radiating member including a plurality of radiating fins radiating heat energy generated by the light source; and a heat exchange chamber formed in the housing case above the radiating member in the light chamber, the heat exchange chamber being open toward a bottom wall of the light chamber such that the heat exchange chamber is in direct communication with the light chamber.

15. The headlamp assembly according to claim 14, wherein the light chamber and the heat exchange chamber are filled with a gas, the gas moving between the light chamber and the heat exchanger.

* * * * *